(12) United States Patent
Archibald et al.

(10) Patent No.: US 7,793,706 B2
(45) Date of Patent: Sep. 14, 2010

(54) HVAC DUAL ZONE TEMPERATURE CONTROL WITH SLAVE REAR ZONE

(75) Inventors: Daniel Archibald, Troy, MI (US); Jason Hendry, Warren, MI (US)

(73) Assignee: DENSO International America, Inc., Southfield, MI (US)

( * ) Notice: Subject to any disclaimer, the term of this patent is extended or adjusted under 35 U.S.C. 154(b) by 1220 days.

(21) Appl. No.: 11/360,628

(22) Filed: Feb. 23, 2006

(65) Prior Publication Data

US 2007/0193716 A1 Aug. 23, 2007

(51) Int. Cl.
*B60H 1/00* (2006.01)
(52) U.S. Cl. .......................... 165/42; 165/202; 454/126
(58) Field of Classification Search .................. 165/41, 165/42, 43, 44, 202, 203, 204; 454/126
See application file for complete search history.

(56) References Cited

U.S. PATENT DOCUMENTS

| | | | | | |
|---|---|---|---|---|---|
| 4,323,111 | A | * | 4/1982 | Iijima | 165/43 |
| 4,453,591 | A | * | 6/1984 | Fehr | 165/42 |
| 4,478,274 | A | * | 10/1984 | Naganoma et al. | 165/204 |
| 4,665,971 | A | * | 5/1987 | Sakurai | 165/203 |
| 4,730,662 | A | * | 3/1988 | Kobayashi | 165/204 |
| 4,791,981 | A | * | 12/1988 | Ito | 165/204 |
| 4,901,788 | A | * | 2/1990 | Doi | 165/204 |
| 5,016,704 | A | * | 5/1991 | Ono | 165/203 |
| 5,120,270 | A | * | 6/1992 | Kato et al. | 454/126 |
| 5,152,335 | A | * | 10/1992 | Doi et al. | 165/204 |
| 5,156,204 | A | * | 10/1992 | Doi | 165/204 |
| 5,181,553 | A | * | 1/1993 | Doi | 165/203 |
| 5,190,096 | A | * | 3/1993 | Taniguchi et al. | 165/202 |
| 5,505,251 | A | * | 4/1996 | Sarbach | 165/202 |
| 7,129,668 | B2 | * | 10/2006 | Kuribayashi et al. | 318/625 |

* cited by examiner

*Primary Examiner*—Ljiljana (Lil) V Ciric
(74) *Attorney, Agent, or Firm*—Harness, Dickey & Pierce, PLC

(57) ABSTRACT

An HVAC assembly including an HVAC case disposed in a passenger compartment of a vehicle includes a first air mix door. The first air mix door is movable between open and closed positions and adapted to adjust a temperature of air blown into a front passenger compartment. A second air mix door is movable between open and closed positions and adapted to adjust a temperature of air blown into a rear passenger compartment. The HVAC assembly further includes a motor and a mechanical linkage operably coupling the motor with the first and second air mix door whereby movement of the motor corresponds to movement of both the first and second air mix doors.

14 Claims, 7 Drawing Sheets

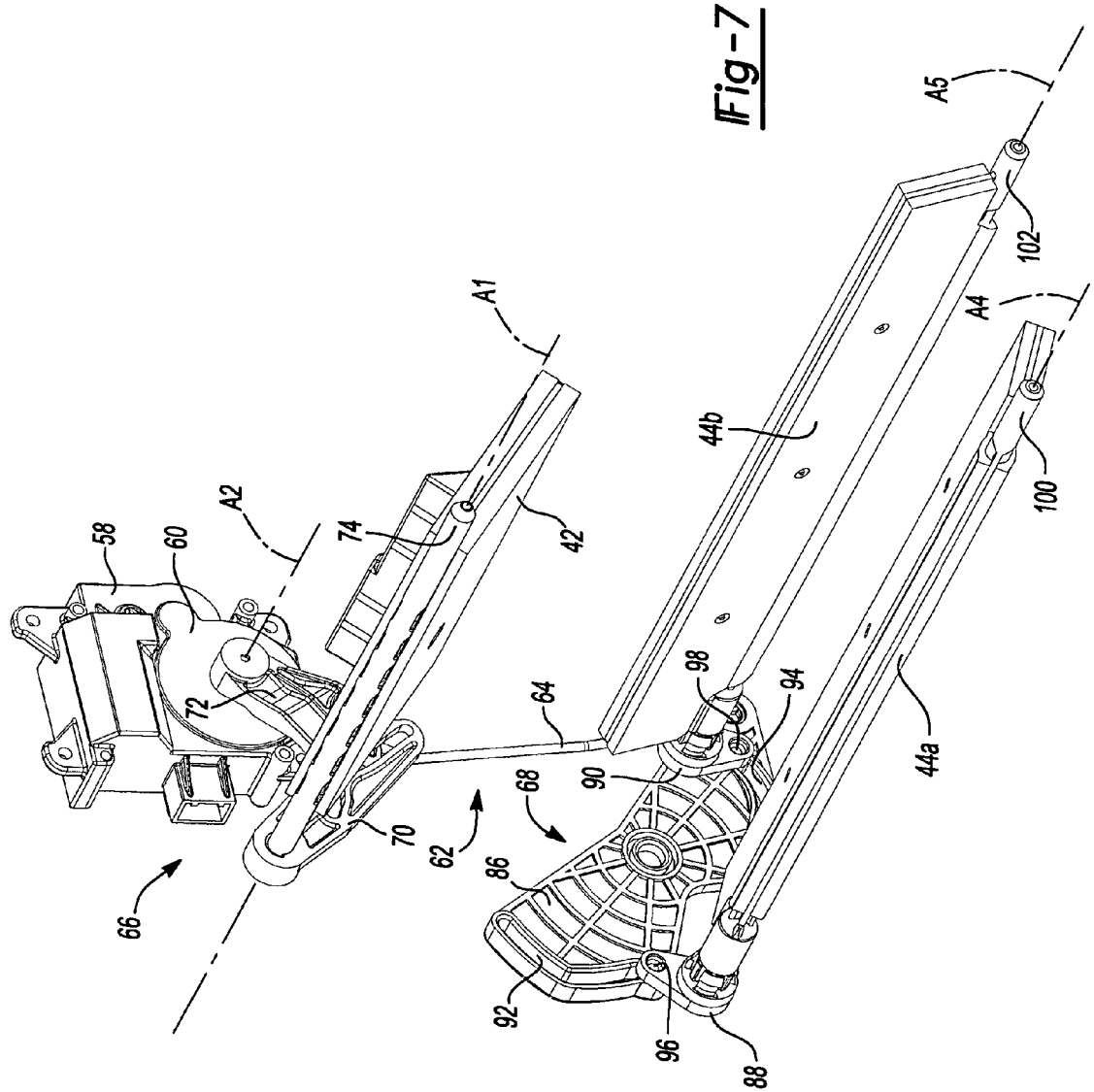

US 7,793,706 B2

HVAC DUAL ZONE TEMPERATURE CONTROL WITH SLAVE REAR ZONE

FIELD OF THE INVENTION

The present invention relates to HVAC systems in vehicles and more particularly to an HVAC module having both front and rear air mix control using a single servo motor.

BACKGROUND OF THE INVENTION

In automotive vehicles, it is common to have a climate control system located within an instrument panel which provides heated or cooled air to occupants through dash panel defrost air outlets, instrument panel venting air outlets and floor directed air outlets. These traditional climate control systems often include a heater core that performs heat exchange between the engine coolant, which is heated by the engine, and the cool air in the cabin/outside environment in order to provide warm air to the passenger compartment. Some vehicles include an air conditioning system that incorporates an evaporator for absorbing heat from the air in the vehicle. The heater core and evaporator are typically provided in an HVAC module case located in the passenger compartment of the vehicle.

In some vehicles, the climate control system is adapted to control three zones of the cabin space. Generally, the three zones include the front driver's side, the front passenger's side and the rear occupant zone. The HVAC case typically includes ducting to accommodate air distribution to these appropriate zones as desired. Air mix doors may be provided for modifying the temperature of air passed through the ducting to the occupants of the vehicle. In one example, a front air mix door (or doors) is provided for modifying the temperature of air passed into the front cabin and a rear air mix door (or doors) is provided for modifying the temperature of air passed into the rear cabin. Typically, a pair of servo motors are provided for independently controlling the respective front and rear air mix doors. In some applications however, multiple servo motors may be cost prohibitive.

SUMMARY OF THE INVENTION

An HVAC module assembly including an HVAC case disposed in the passenger compartment of a vehicle includes a first air mix door. The first air mix door is movable between open and closed positions and adapted to adjust the temperature of air blown into the front passenger compartment. A second air mix door is movable between open and closed positions and adapted to adjust the temperature of air blown into a rear passenger compartment. The HVAC assembly further includes a motor and a mechanical linkage operably coupling the motor with the first and second air mix doors whereby movement of the motor corresponds to movement of both the first and second air mix doors.

According to other features, the linkage includes a rod interconnected between the first and second air mix doors. The rod is connected on a first end to a first cam communicating with the first air mix door. The rod is connected on a second end to a second cam communicating with the second air mix door. In one example, the second air mix door includes a pair of rear air mix doors such that the second cam is adapted to operably rotate both air mix doors of the pair of air mix doors.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a rear perspective view of the linkage of FIG. 6.

DETAILED DESCRIPTION OF THE PREFERRED EMBODIMENTS

The following description of the preferred embodiment(s) is merely exemplary in nature and is in no way intended to limit the invention, its application, or uses.

Figure 1:
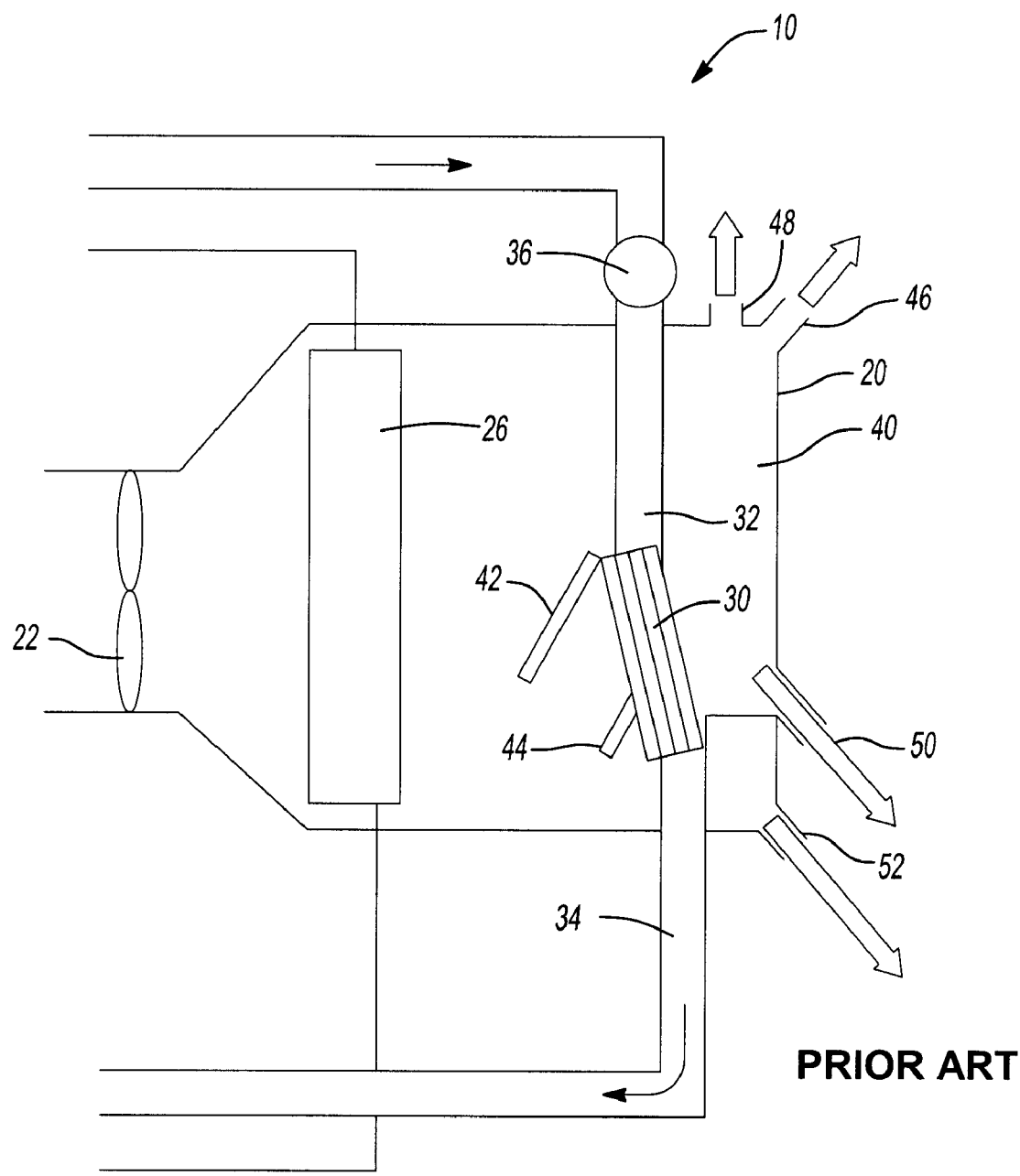
FIG. 1 is a functional block diagram of an HVAC system of a vehicle.

With initial reference to FIG. 1, a block diagram of a conventional vehicle heating ventilation and air conditioning ("HVAC") system is shown and generally identified at reference 10. An HVAC case 20 forms a ventilation duct through which air conditioned and/or heated air is sent into the passenger compartment. The HVAC case 20 contains a fan 22 which is arranged on the upstream side of an evaporator 26. Low pressure refrigerant flowing into the evaporator 26 absorbs heat from the air inside the HVAC case 20 during refrigerant evaporation. An inside/outside air switch box (not shown) may be arranged on the suction side of the fan 22 (the left side in FIG. 1). Alternatively, the fan 22 may be housed within the inside/outside air switch box. The air inside the passenger compartment (inside air) or the air outside the passenger compartment (outside air) switched and introduced through the inside/outside air switch box is sent into the HVAC case 20 by the fan 22.

The HVAC case 20 accommodates, on the downstream side of the evaporator 26, a hot water heater core (heat exchanger) 30. The heater core 30 includes an inlet pipe 32 and an outlet pipe 34. Hot water (coolant) of the vehicle engine (not shown) is directed to the heater core 30 through the inlet pipe 32 by a water pump (not shown). A water valve 36 may be incorporated to control the flow volume of engine coolant supplied to the heater core 30.

A bypass channel 40 is formed beside the hot water heater core 30. A front passenger air mix door 42 is provided to adjust the volume ratio between warm air and cool air that passes through the hot water heater core 30 and the bypass channel 40, respectively. The front passenger air mix door 42 adjusts the temperature of the air blown into the front passenger compartment by adjusting the volume ratio between the warm air and the cool air. Similarly, a pair of rear passenger air mix doors 44 are provided to adjust the volume ratio between warm air and cool air that passes through the hot water heater core 30 and the bypass channel 40, respectively. The pair of rear passenger air mix doors 44 adjust the temperature of air blown into the rear passenger compartment by adjusting the volume ratio between the warm and the cool air. As illustrated in FIGS. 2-7, the pair of rear passenger air mix doors 44 are depicted as doors 44a and 44b, respectively.

Additionally, a face outlet 46, a defroster outlet 48, a foot outlet 50 and a rear cabin outlet 52 are formed at the downstream end of the HVAC case 20. The face outlet 46 directs air toward the upper body portions of passengers, the defroster outlet 48 directs air toward the internal surface of a windshield, the foot outlet 50 directs air toward the feet of the front seat passengers and the rear cabin outlet 52 directs air toward the rear seat passengers of the vehicle. The outlets 46-52 are opened and closed by outlet mode doors (not shown). It is appreciated that the block diagram and related components described in relation to FIG. 1 are merely exemplary and other configurations may be used.

Figure 2:
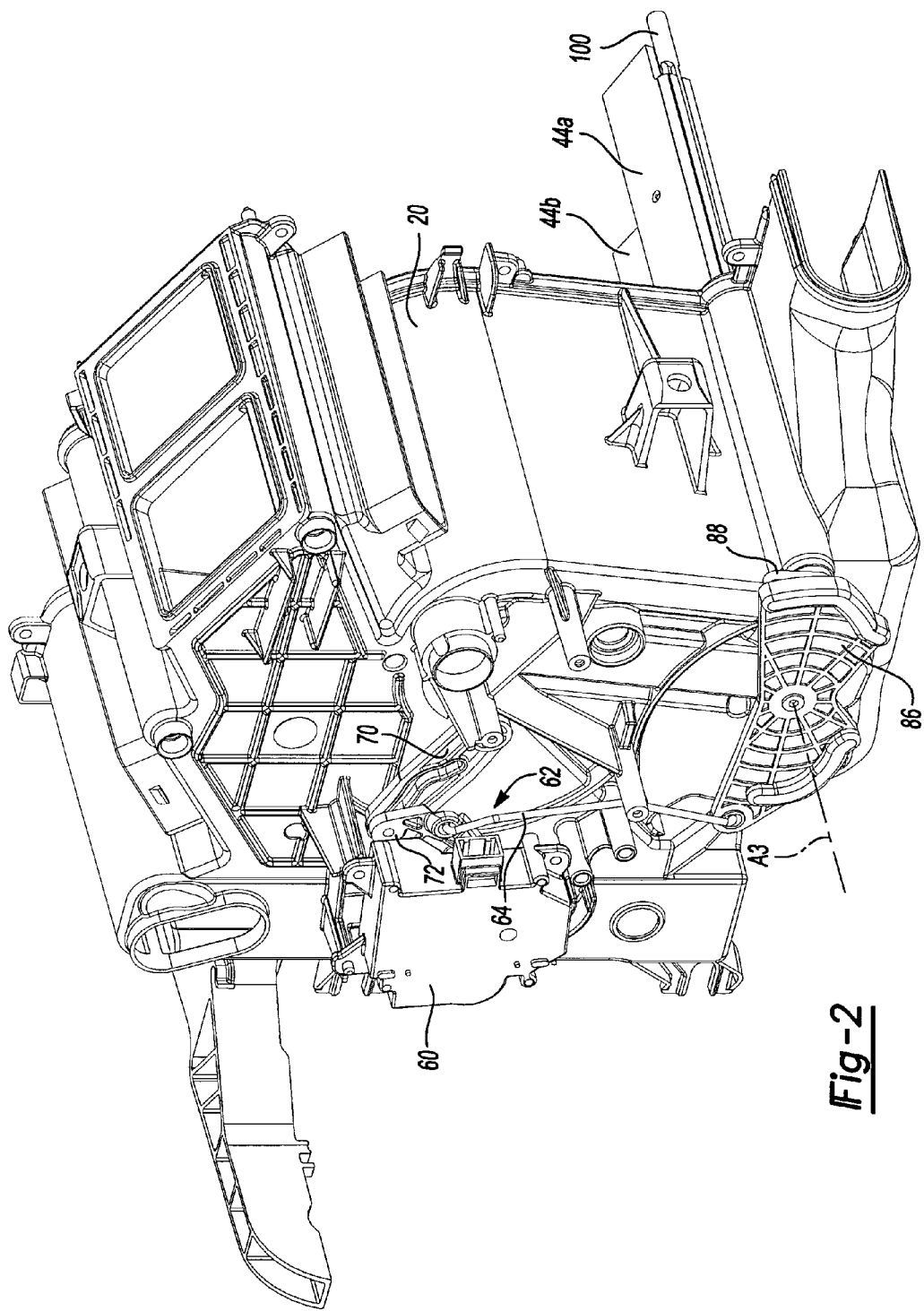
FIG. 2 is a perspective view of the HVAC case incorporating a single servo motor and linkage shown in a first position according to the present teachings.

With continued reference to FIG. 1 and further reference to FIGS. 2-4, the HVAC case 20 will be described in greater detail. The HVAC case 20 according to the present teachings incorporates a single motor or servo 58 (as best illustrated in FIGS. 4 and 7) for concurrently controlling the position of the front passenger air mix door 42 and the rear passenger air mix doors 44a, 44b. The servo 58 is contained in a housing 60 coupled to the case 20. A linkage 62 is provided having a rod 64 connected at opposite ends to a first cam assembly 66 and a second cam assembly 68, respectively.

The first cam assembly 66 is operably coupled between the front passenger air mix door 42 and the servo 58. The second cam assembly 68 is operably coupled between the rod 64 and the rear passenger air mix doors 44a, 44b. In sum, the configuration of the linkage 62 allows rotation of the servo 58 to correspond with simultaneous rotation of the front and rear air mix doors 42, 44a, and 44b respectively. As a result, the rear air mix doors 44a, 44b are coordinated for concurrent movement with the front air mix door 42. As illustrated in FIGS. 2-4, the front and rear air mix doors 42, 44a, and 44b are shown in a position corresponding to the maximum hot air deliverable to the front and rear passengers.

Figure 4:
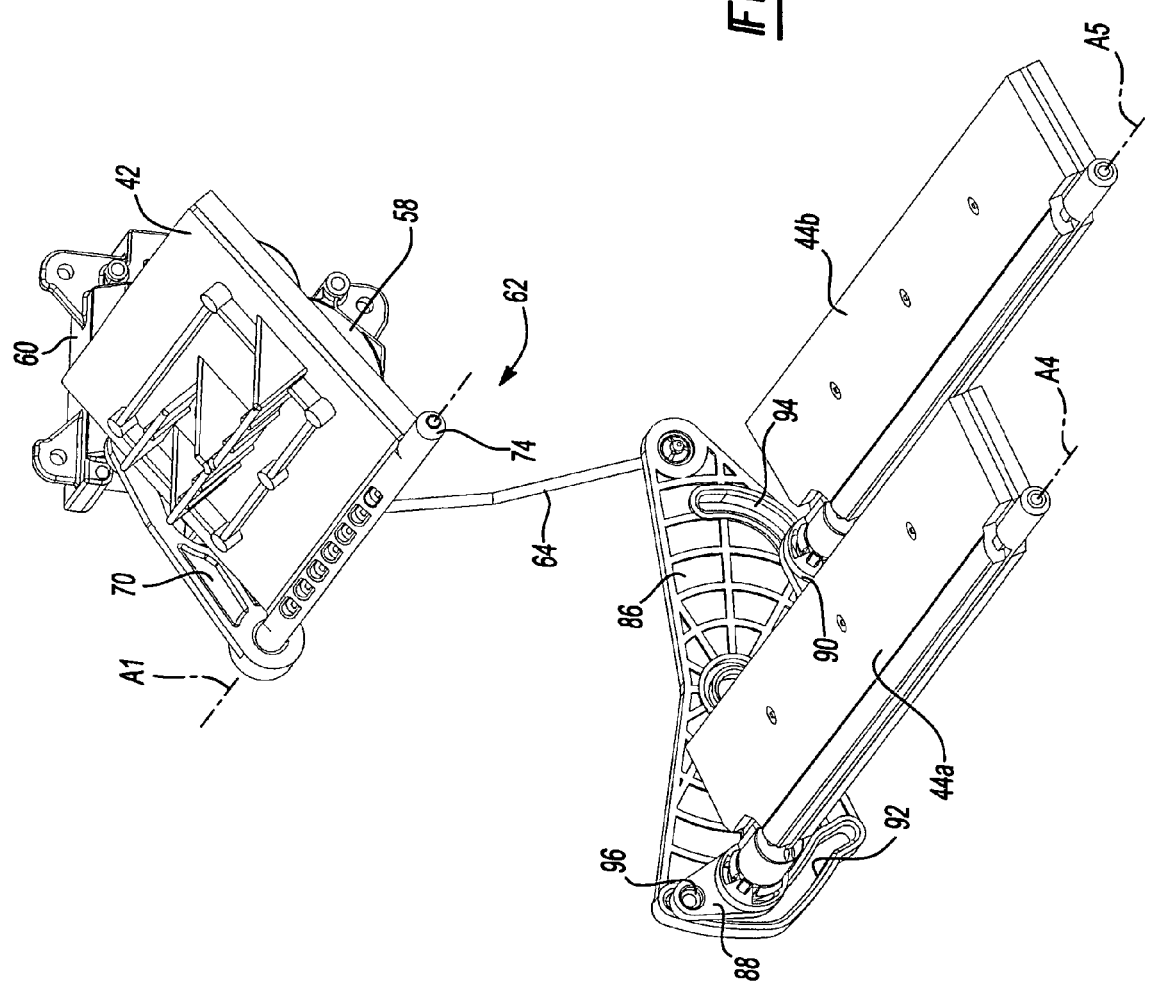
FIG. 4 is a rear perspective view of the linkage of FIG. 3.
Figure 5:
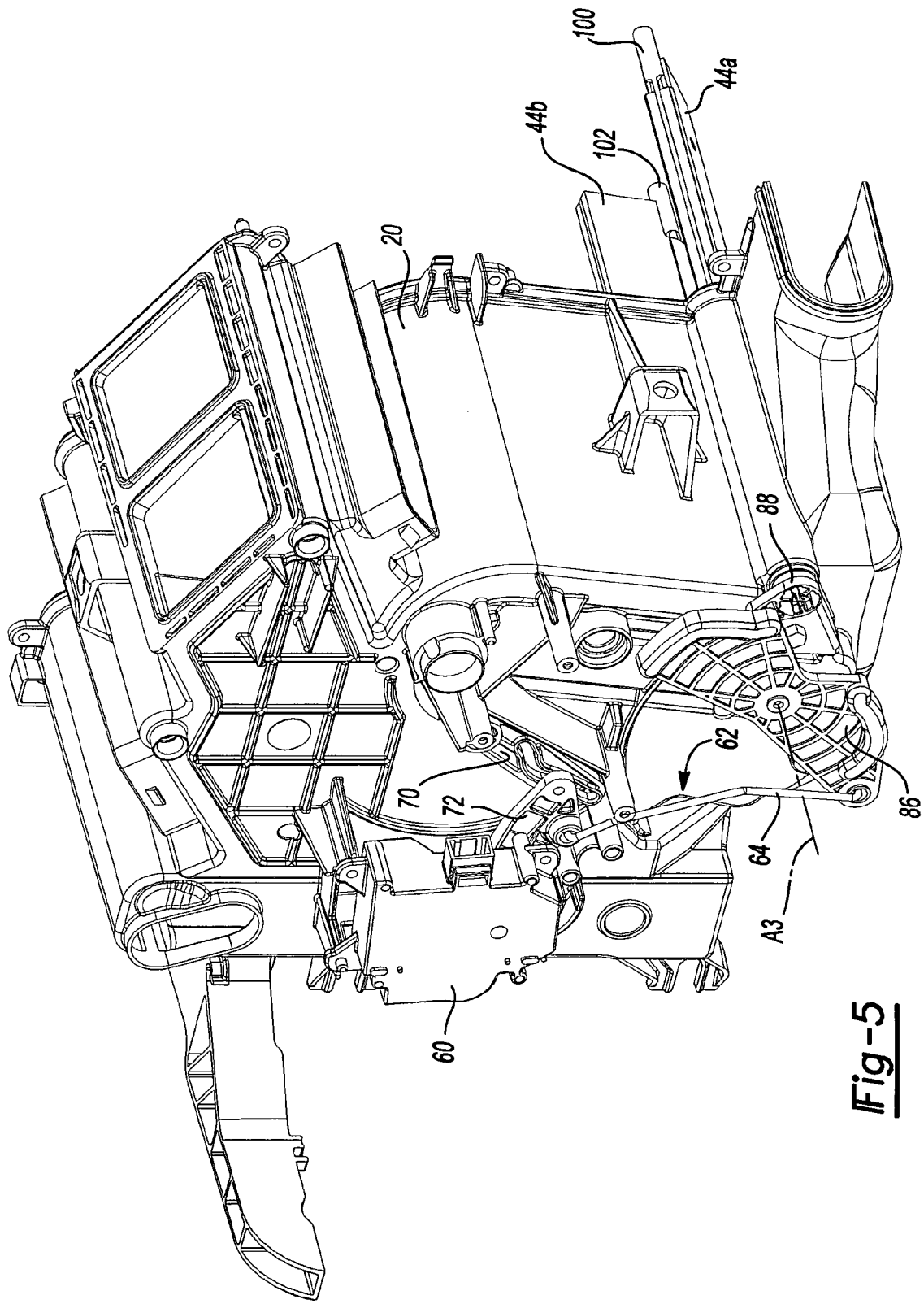
FIG. 5 is a perspective view of the HVAC case of FIG. 2 shown in a second position according to the present teachings.
Figure 6:
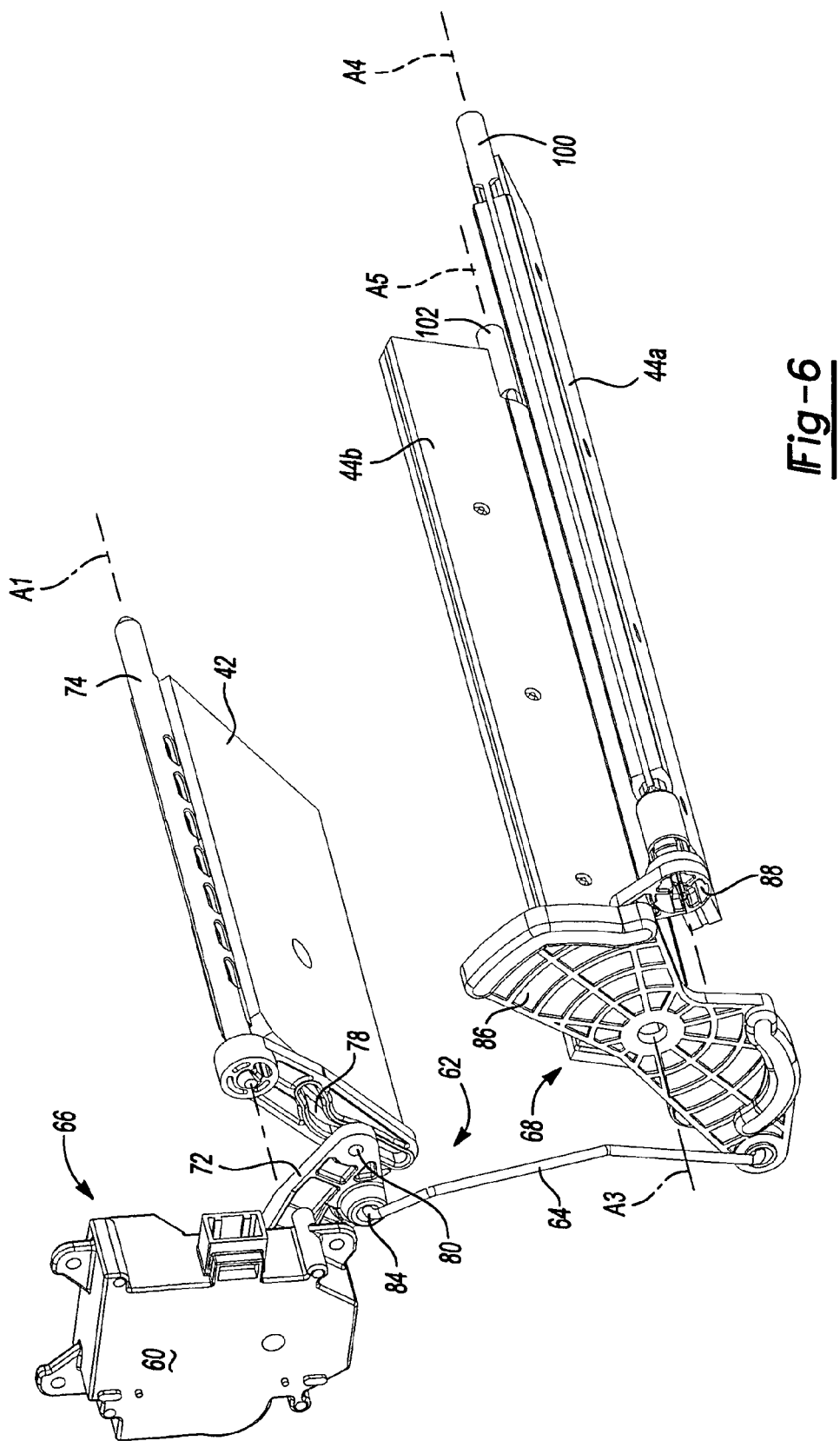
FIG. 6 is a front perspective view of the linkage of the HVAC case of FIG. 5.

With reference now to FIGS. 5-7, the front and rear air mix doors 42, 44a, and 44b are shown in a position corresponding to the maximum cold air deliverable to the front and rear passengers. As viewed from FIGS. 4 and 7, the servo 58 rotates in a counterclockwise direction from the maximum hot position (FIG. 4) to the maximum cold position (FIG. 7).

With reference now to all drawings, the linkage 62 will be described in greater detail. The first cam assembly 66 generally includes a first and second link arm 70 and 72, respectively. The first link arm 70 includes a first end coupled to a shaft 74 formed with the front air mix door 42 (FIG. 3). The shaft 74 is housed within the HVAC case 20 with freedom to rotate and defines a first axis A1 through which the first link arm 70 rotates about. The first link arm 70 defines a groove 78 receiving a cam pin 80 extending from the second link arm 72. The second link arm 72 is coupled at an opposite end to the servo 58 for rotation therewith about a second axis A2 (FIG. 7). The rod 64 is rotatably coupled to an intermediate portion 84 of the second link arm 72.

The second cam assembly 68 generally includes a cam or rocker 86 operably coupled to the pair of rear air mix doors 44a, 44b through a pair of swing arms 88 and 90, respectively. The rocker 86 defines a pair of grooves 92 and 94 for accepting a respective pair of pins 96 and 98 extending from first ends of the swing arms 88 and 90, respectively. The swing arms 88 and 90 are coupled at second ends to respective shafts 100 and 102 defined along the rear air mix doors 44a, 44b. The rocker 86 is fixed for rotation about a third axis A3 (FIG. 2). The rod 64 is rotatably coupled at a first end of the rocker 86. The rear air mix doors 44a, 44b are fixed (to the HVAC case 20) for rotation about a fourth and fifth axis A4 and A5, respectively (FIG. 4). The fourth and fifth axes A4 and A5 correspond to the respective shafts 100 and 102 of the rear air mix doors 44a and 44b.

Movement of the linkage 62 from the first position (FIGS. 2-4) to the second position (FIGS. 5-7) will now be described in greater detail. As explained above, the servo 58 is positioned in FIGS. 2-4 at a location corresponding to the maximum heated air delivered through the outlets 46, 48, 50 and 52. In this way, the front and rear air mix doors 42, 44a and 44b are positioned such that air is forced to pass through the heater core 30. The servo 58 is positioned in FIGS. 5-7 at a location corresponding to the maximum cool air deliverable through the outlets 46, 48, 50 and 52. As a result, the front and rear air mix doors 42, 44a and 44b are positioned such that air is routed around rather than through the heater core 30. Movement of the doors 42, 44a and 44b is accomplished by counterclockwise movement of the servo 58 from a position shown in FIG. 4 to a position shown in FIG. 7 about axis A2. It is appreciated that a plurality of intermediate positions may be attained between the first and second position to achieve a range of temperatures. While not specifically shown, a user input such as a temperature adjustment on a vehicle instrument panel (not shown) may initiate movement of the servo 58. In one arrangement, a body control module (not shown) may control the servo 58 based on such a user input. Other arrangements may be used.

Figure 3:
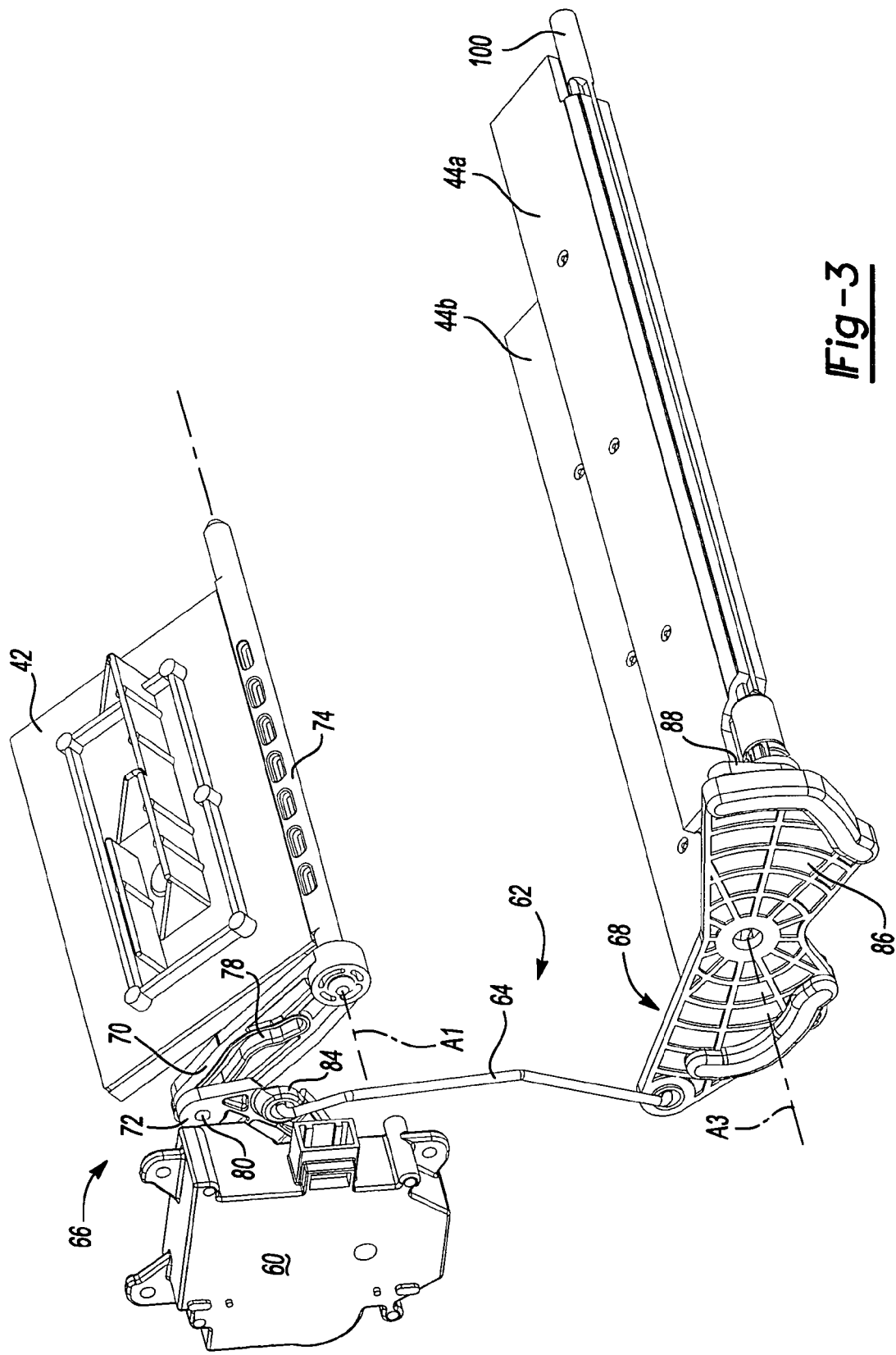
FIG. 3 is a front perspective view of the linkage of the HVAC case of FIG. 2.

As viewed from FIG. 3, clockwise movement of the servo 58 causes the second link arm 72 to rotate with the servo 58. As a result, the cam pin 80 drives the first link arm 70 by interacting within the groove 78 defined in the first link arm 70. This movement causes the first link arm 70 to rotate about the first axis A1 in a counterclockwise direction as viewed in FIG. 3. As a result, the front air mix door 42 rotates counterclockwise about the shaft 74 (axis A1). Rotation of the second link arm 72 with the servo 58 causes concurrent movement of the rocker 86 through the rod 64. In this way, clockwise movement of the servo 58 also causes the rocker 86 to rotate counterclockwise about axis A3. Because the rear air mix doors 44a and 44b are fixed for rotation about axes A4 and A5, respectively, the pins 96 and 98 of the swing arms 88 and 90 are urged to travel in the respective grooves 92 and 94. With specific reference now to FIG. 7, movement of pin 98 along groove 94 causes the swing arm 90 and the rear air mix door 44b to rotate counterclockwise about axis A5. Concurrently, movement of the pin 96 along groove 92 causes the swing arm 88 and the rear air mix door 44a to rotate clockwise about axis A4.

Some advantages of the HVAC dual zone temperature control with a slave linkage are that a single motor can be utilized, as opposed to multiple motors. Additionally, the rear passenger compartment passengers can receive the same temperature of air as the front passenger compartment passengers with the use of a single motor. Furthermore, because the same temperature air can be supplied to two different areas of a passenger compartment using only a single motor, there is a cost and weight savings.

Those skilled in the art can now appreciate from the foregoing description that the broad teachings of the present invention can be implemented in a variety of forms. For example the linkage and respective front and rear cam assemblies are merely exemplary. It is appreciated that many other mechanical configurations may be employed for translating rotational motion of a single servo motor into rotational movement of at least two air mix doors. Therefore, while this invention has been described in connection with particular examples thereof, the true scope of the invention should not be so limited since other modifications will become apparent to the skilled practitioner upon a study of the drawings, the specification and the following claims.

What is claimed is:

1. An HVAC assembly including an HVAC case disposed in a passenger compartment of a vehicle, the assembly comprising:
   a first air mix door disposed in the HVAC case on a first pivot axis and adapted to adjust a temperature of air blown into a front passenger compartment;
   a second air mix door disposed in the HVAC case on a second pivot axis and adapted to adjust a temperature of air blown into a rear passenger compartment; and
   an actuator operably coupled to both the first and second air mix doors whereby movement of the actuator corresponds to movement of both the first and second air mix doors.

2. The HVAC assembly of claim 1 wherein the actuator includes a motor.

3. The HVAC assembly of claim 2 wherein the motor includes a servo motor.

4. An HVAC assembly including an HVAC case disposed in a passenger compartment of a vehicle, the assembly comprising:
   a first air mix door disposed in the HVAC case and adapted to adjust a temperature of air blown into a front passenger compartment;
   a second air mix door disposed in the HVAC case and adapted to adjust a temperature of air blown into a rear passenger compartment; and
   an actuator operably coupled to both the first and second air mix doors whereby movement of the actuator corresponds to movement of both the first and second air mix doors, wherein a linkage interconnects the first air mix door, the second air mix door, and the actuator.

5. The HVAC assembly of claim 4 wherein the linkage includes a rod connected on a first end to a first cam communicating with the first air mix door.

6. The HVAC assembly of claim 5 wherein the rod is connected on a second end to a second cam communicating with the second air mix door.

7. The HVAC assembly of claim 5 wherein the second air mix door includes a pair of rear air mix doors, and wherein the second cam is adapted to operably rotate both air mix doors of the pair of air mix doors.

8. An HVAC assembly including an HVAC case disposed in a passenger compartment of a vehicle, the assembly comprising:
   a first air mix door disposed in the HVAC case on a first pivot axis and adapted to adjust a temperature of air blown into a first outlet;
   a second air mix door disposed in the HVAC case on a second pivot axis and adapted to adjust a temperature of air blown into a second outlet;
   a linkage interconnecting the first and second air mix doors; and
   an actuator coupled to both the first and second air mix doors wherein movement of the actuator corresponds to movement of both the first and second air mix doors.

9. The HVAC assembly of claim 8 wherein the actuator includes a motor.

10. The HVAC assembly of claim 9 wherein the motor includes a servo motor.

11. The HVAC assembly of claim 8 wherein the linkage is a rod.

12. The HVAC assembly of claim 11 wherein a first end of the rod is connected to a first cam communicating with the first air mix door.

13. The HVAC assembly of claim 12 wherein a second end of the rod is connected to a second cam communicating with the second air mix door.

14. The HVAC assembly of claim 13 wherein the second air mix door includes a pair of rear air mix doors, and wherein the second cam is adapted to operably rotate both air mix doors of the pair of air mix doors.

* * * * *